(12) United States Patent
Helmeke

(10) Patent No.: US 7,344,619 B2
(45) Date of Patent: Mar. 18, 2008

(54) METHOD OF MAKING WATER REPELLENT LAMINATES

(75) Inventor: Marietta B. Helmeke, Little Canada, MN (US)

(73) Assignee: H.B. Fuller Licensing & Financing, Inc, St. Paul, MN (US)

(*) Notice: Subject to any disclaimer, the term of this patent is extended or adjusted under 35 U.S.C. 154(b) by 0 days.

(21) Appl. No.: 11/438,449

(22) Filed: May 22, 2006

(65) Prior Publication Data

US 2006/0269758 A1    Nov. 30, 2006

(51) Int. Cl.
*B32B 27/40* (2006.01)
(52) U.S. Cl. .................. 156/331.7; 528/83; 428/423.1
(58) Field of Classification Search ............. 156/331.7; 528/83; 428/423.1
See application file for complete search history.

(56) References Cited

U.S. PATENT DOCUMENTS

| | | | |
|---|---|---|---|
| 4,194,041 A | 3/1980 | Gore et al. | |
| 4,775,719 A | 10/1988 | Markevka et al. | |
| 4,808,255 A | 2/1989 | Markevka et al. | |
| 4,820,368 A | 4/1989 | Markevka et al. | |
| 5,115,073 A * | 5/1992 | Meckel et al. ................ 528/83 | |
| 5,166,300 A | 11/1992 | Rumon et al. | |
| 5,851,661 A | 12/1998 | Werenicz et al. | |
| 5,869,593 A | 2/1999 | Helmeke et al. | |
| 6,133,400 A | 10/2000 | Helmeke | |
| 6,136,136 A * | 10/2000 | Heider ..................... 156/331.4 |
| 6,221,978 B1 | 4/2001 | Li et al. | |
| 2003/0215617 A1 | 11/2003 | Shehata et al. | |

FOREIGN PATENT DOCUMENTS

| | | |
|---|---|---|
| EP | 0 288 214 B1 | 7/1992 |
| EP | 1 114 854 A1 | 7/2001 |
| EP | 1 433 394 A1 | 6/2004 |
| WO | WO 00/50529 | 8/2000 |

OTHER PUBLICATIONS

"Product Range Copolyesters" Dynacoll 2007.*

* cited by examiner

*Primary Examiner*—John L Goff

(57) ABSTRACT

The invention relates to a method of making a water repellent laminate including applying a hot melt moisture cure adhesive to a primary substrate and bonding the primary substrate with a secondary substrate that has been treated with a water repellent material prior to the lamination. The adhesive composition includes a hot melt moisture cure polyurethane prepolymer formed from a polyol component and a polyisocyanate component. The polyol component includes a first polyether polyol having a number average molecular weight of from about 500 to about 8,000, a first polyester polyol having a melting point of less than about 40° C. or a second polyether polyol having a molecular weight of from about 200 to about 1,000, and a crystalline polyester polyol having a melting point of from about 40° C. to about 120° C.

11 Claims, No Drawings

METHOD OF MAKING WATER REPELLENT LAMINATES

FIELD OF THE INVENTION

The invention is directed to a method of making water repellent laminates with a hot melt moisture cure polyurethane adhesive composition.

BACKGROUND OF THE INVENTION

Water repellent laminates are used for making various kinds of water repellent garments. A water repellent laminate normally includes a primary substrate and a secondary substrate with an adhesive sandwiched between two substrates. The primary substrate is a substrate where the adhesive is first applied on one of its two surfaces. The secondary substrate is a substrate that is bonded to the adhesive bearing surface of the primary substrate to form the laminate. To impart water repellency to a water-repellent laminate, there are different ways of treating and laminating the substrates. The primary and secondary substrates may be laminated prior to the water repellent treatment. Or, the secondary substrate may be treated with a water repellent material prior to the lamination, but only on its exposing surface, i.e., the surface that will expose to the environment, e.g., a wet environment. Its bonding surface, i.e., the surface that will bond to the adhesive bearing surface of the primary substrate remain untreated. Alternatively, the secondary substrate may be treated with a water repellent material on both its exposing surface as well as its bonding surface prior to laminating with the adhesive bearing primary substrate. However, when the treated bonding surface of a secondary substrate bonds to the adhesive bearing surface of a primary substrate with an existing hot melt moisture cure polyurethane adhesive in the textile industry, the water repellent laminates formed therefrom exhibits, thus far, minimal adhesion.

SUMMARY OF THE INVENTION

In one aspect, the invention features a method of making a water repellent laminate. The laminate includes a primary substrate having a first surface and a second surface, and a secondary substrate having a bonding surface and an exposing surface. The bonding surface and the exposing surface of the secondary substrate have been treated with a water repellent material. The method includes a) applying a hot melt moisture cure polyurethane adhesive composition on the first surface of the primary substrate to form an adhesive bearing surface; and b) contacting the adhesive bearing surface of the primary substrate with the bonding surface of the secondary substrate to form a laminate. The adhesive composition includes a hot melt moisture cure polyurethane prepolymer having a weight average molecular weight of no greater than about 20,000 g/mole. The prepolymer is a reaction product of a polyol component and a polyisocyanate component. The polyol component includes a first polyether polyol formed from at least one monomer chosen from ethylene oxide, propylene oxide, 1,2-butylene oxide, 1,4-butylene oxide, or mixtures thereof; a first polyester polyol having a melting point of less than about 40° C.; and a crystalline polyester polyol having a melting point of from about 40° C. to about 120° C.

In one embodiment, the adhesive composition further includes an amorphous polyester polyol that has a number average molecular weight of from about 500 g/mole to about 6,000 g/mole.

In another aspect, the invention features a method of making a water repellent laminate that has a primary substrate having a first surface and a second surface and a secondary substrate having a bonding surface and an exposing surface. The bonding surface and exposing surface of the secondary substrate have been treated with a water repellent material. The method includes a) applying a hot melt moisture cure polyurethane adhesive composition on the first surface of the primary substrate to form an adhesive bearing surface; and b) contacting the adhesive bearing surface of the primary substrate with the bonding surface of the secondary substrate to form a laminate. The adhesive composition includes a hot melt moisture curable polyurethane prepolymer having a weight average molecular weight of no greater than about 20,000 g/mole. The prepolymer is a reaction product of a polyol component and a polyisocyanate component. The polyol component includes a first polyether polyol formed from at least one monomer chosen from ethylene oxide, propylene oxide, 1,2-butylene oxide, 1,4-butylene oxide, or mixtures thereof; a second polyether polyol having a number average molecular weight of from about 200 g/mole to about 1,000 g/mole, and a crystalline polyester polyol having a melting point of from about 40° C. to about 120° C.

In another aspect, the invention features water repellent laminates that are prepared by the methods of the invention.

The laminates of the invention exhibits good washability (or washing resistance, or hydrolysis resistance). Good washability in a consumer setting is defined as being able to withstand greater than about 20 standard wash cycles. Good washability is important when the compositions are utilized on clothing such as outdoor apparel or athletic apparel.

In one embodiment, the water repellent laminate includes a thermoplastic film as the primary substrate and a durable water repellent (DWR) fabric as the secondary substrate. The laminate exhibits soft hand, washability and dry cleaning resistance.

In another embodiment, a water repellent laminate includes a breathable thermoplastic film as the primary substrate and a durable water repellent (DWR) fabric as the secondary substrate. The laminate exhibits soft hand, washability, dry cleaning resistance as well as breathability.

The water repellent laminates of the invention can be used, for example, in manufacturing water repellent garments e.g., protective rain gear, athletic and sportswear apparel gear, military uniforms, industrial protective garments, medical garments, tents, outdoor sleeping bags, camping materials, etc.

DETAILED DESCRIPTION OF THE INVENTION

In one aspect, the invention features a water repellent laminate that includes at least two substrates—a primary substrate and a secondary substrate with a hot melt moisture cure polyurethane adhesive composition sandwiched between the two substrates. The primary substrate has an adhesive bearing surface where an adhesive is first applied thereon. The secondary substrate has an exposing surface and a bonding surface that is bonded to the adhesive bearing surface of the primary substrate to form the laminate. The primary substrate can be made of any suitable material such as a thermoplastic film that may or may not be moisture vapor permeable depending on the end use, or a fabric that may or may not be treated with water repellents, also depending on the end use. Examples of the thermoplastic film include e.g., polytetrafluoroethylene (PTFE), thermoplastic polyurethane resin (TPU), polyester, polypropylene, etc. Examples of fabric as the primary substrate includes such as woven or nonwoven fabrics, cotton, polyester, polyamide (Nylon), etc. The secondary substrate can be made of any suitable material such as woven or nonwoven fabrics, cotton, polyester, polyamide (Nylon), etc. The secondary substrate has been treated with a water repellent material on both its exposing surface and its bonding surface prior to the lamination. The exposing surface is the surface that is exposed to the environment such as a wet environment, whereas the bonding surface is in contact with the adhesive bearing surface of the primary substrate when forming the laminate.

According to the invention, "water repellent" is exchangeable with the term "waterproof" or "water resistant".

"A copolymer of propylene oxide and ethylene oxide" and "a copolymer of butylene oxide and ethylene oxide" refers to those polymers in which the end groups on the polymer/chain are predominately ethylene oxide groups.

In another aspect, the invention features a method of making a water repellent laminate using a hot melt moisture cure polyurethane adhesive composition. The adhesive composition includes a hot melt isocyanate terminated polyurethane prepolymer that is moisture curable when exposed to ambient moisture.

The polyurethane prepolymer has a weight average molecular weight of no greater than about 20,000 g/mole, or no greater than about 15,000 g/mole, or no greater than about 13,000 g/mole, or no less than about 5,000 g/mole, or no less than about 8,000 g/mole.

The prepolymer includes a reaction product of a polyol component and a polyisocyanate component. In one embodiment, the polyol component includes a first polyether polyol, a first polyester polyol, and a crystalline polyester polyol. In another embodiment, the polyol component further includes an amorphous polyester polyol. In yet another embodiment, the polyol component includes a first polyether polyol, a second polyether polyol, and a crystalline polyester polyol.

Useful first polyether polyols include polymers that are formed from one or more monomers including ethylene oxide, propylene oxide, 1,2-butylene oxide, 1,4-butylene oxide, and mixtures thereof. The number average molecular weight of the first polyether polyol is from about 500 to about 8,000 grams/mole. In one embodiment, the first polyether polyol includes a homopolymer of propylene oxide that has a number average molecular weight of from about 500 to about 4,000 g/mole. In another embodiment, the first polyether polyol includes a copolymer of propylene oxide and ethylene oxide that has a number average molecular weight of from about 500 to about 4,000 g/mole. In other embodiments, the first polyether polyol includes a homopolymer of propylene oxide, or a homopolymer of butylene oxide, or a copolymer of propylene oxide and ethylene oxide, or a copolymer of butylene oxide and ethylene oxide, or mixtures thereof. These copolymers may have a random or a block configuration and a number average molecular weight of from about 1,000 to about 6,000 g/mole. The first polyether polyol is present in an amount of from about 10 wt % to about 60 wt %, or from about 20 wt % to about 50 wt %, based on the total weight of the adhesive composition.

Useful second polyether polyol include such as those alkylene glycols having a number average molecular weight of no greater than about 1,000 g/mole, or no less than about 200 g/mole. Useful alkylene glycols include those having 3 or more carbon atoms such as propylene glycol, or butylene glycol. Examples of commercially available second polyether polyols include Voranol 220-260 from Dow Chemical Company, or Poly-G 20-265 from Arch Chemicals, Inc. Second polyether polyol is present in an amount of no less than about 5 wt %, or no less than about 10 wt %, or no greater than about 30 wt %, or no greater than about 20 wt %, based on the total weight of the adhesive composition.

Both the first and second polyether polyols are available from manufacturers such as Huntsman Corp. (Houston, Tex.); Texaco Chemical Co. (Bellaire, Tex.); BASF Corp. (Charlotte, N.C.); Arch Chemicals, Inc. (Stamford, Conn.); Mazer Chemicals (Gurnee, Ill.); Ashland Chemical Co., Drew Division (Boonton, N.J.); Dow Chemical Co. (Midland, Mich.); Witco Corp. (Houston, Tex.); and Bayer Corp. (Pittsburgh, Pa.).

Useful first polyester polyols include those that have a melting point of less than about 40° C., and those that have number average molecular weight of from about 500 to about 6,000 g/mole. Examples of commercially available first polyester polyols include Desmophen S 107-55 from Bayer Corp. (Pittsburgh, Pa.), and Dynacoll 7250 from Degussa Corp. (Piscataway, N.J.). First polyester polyol is present in an amount of from about 5 wt % to about 50 wt %, or from about 10 wt % to about 40 wt %, based on the total weight of the adhesive composition.

Useful crystalline polyester polyols include those that have a melting point of from about 40° C. to about 120° C., a glass transition temperature ($T_g$) of no greater than about 0° C.

Examples of the crystalline polyester polyols include the reaction products of either hexane diol or butane diol with an acid that includes adipic acid, dodecanedioic acid, sebacic acid, terephthalic acid, or mixtures thereof. In some embodiments, the acid is sebacic acid or adipic acid. In some embodiments, the crystalline polyester polyols are free of ether linkages because an ether linkage may decrease the crystallinity of the polyester polyols. Examples of commercially available crystalline polyester polyols include Dynacoll® 7360, 7371, 7380 and 7381 from Degussa Corp. The crystalline polyol is present from about 10 wt % to about 40 wt %, or from about 15 wt % to about 30 wt %, based on the total weight of the adhesive composition.

Useful amorphous polyester polyols include those that have a number average molecular weight of from about 500 to about 6,000 g/mole. Examples of commercially available amorphous polyester polyols include Stepanpol PN-110 from Stepan Company (Northfield, Ill.). Amorphous polyester polyol is present in an amount of from about 5 wt % to about 20 wt %, based on the total weight of the adhesive composition.

The polyisocyanate component includes polyfunctional isocyanate compounds that have two or more isocyanate (—NCO) groups. Those polyisocyanate compounds may be aliphatic, aromatic, or mixtures thereof. The polyisocyanate compounds may also contain other substituents that do not substantially adversely affect the properties of the prepolymers such as the viscosity of the isocyanate terminated prepolymers, or the adhesive properties of the bond line, or the reactivity of the—NCO groups during the formation of the prepolymer. Examples of useful aromatic polyisocyanates include diphenylmethane diisocyanate compounds (MDI) including its isomers, carbodiimide modified MDI, diphenylmethane 4,4'-diisocyanate, diphenylmethane-2,2'-diisocyanate, diphenylmethane-2,4'-diisocyanate, and other oligomeric methylene isocyanates; toluene diisocyanate compounds (TDI) including isomers thereof; tetramethylxylene diisocyanate (TMXDI), isomers of naphthalene diisocyanate, isomers of triphenylmethane triisocyanate, and mixtures thereof. Examples of useful aliphatic polyisocyanates includes, for example, isophorone diisocyanate, hydrogenated aromatic diisocyanates, aliphatic polyisocyanates and cycloaliphatic polyisocyanates. Other useful polyisocyanate compounds are described in U.S. Pat. Nos. 4,775,719, 4,808,255, and 4,820,368, which are incorporated herein by reference. Examples of commercially available polyisocyanate compound include Isonate® 125M, which is a pure diphenylmethane diisocyanate (MDI), available from Dow Chemical Co. (Midland, Mich.).

A catalyst may optionally be utilized in the preparation of the prepolymer to improve curing speed without adversely affecting other physical properties such as green strength or thermal stability. Preferred catalysts include both ether and morpholine functional groups, with 2,2-dimorpholinoethyl ether and di(2,6-dimethyl morpholinoethyl)ether being the most preferred. Examples of commercially available catalyst include Jeffcat™ DMDEE (4,4'-(oxydi-2,1-ethanediyl)bis-morpholine) available from Huntsman Corp. (Houston, Tex.). The catalyst(s) are present in an amount of from about 0.01% to about 2% by weight, based on the total weight of the adhesive composition.

Optionally, a stabilizer or antioxidant may also be added to the adhesive composition to protect the composition from degradation induced by, e.g., heat, light or residual catalyst from the raw materials. Examples of commercially available antioxidants include Irganox® 565, 1010 and 1076, all hindered phenolic antioxidants available from Ciba-Geigy (Hawthorne, N.Y.), and Anox® 20, also a hindered phenolic antioxidant from Great Lakes Chemicals (West Lafayette, Ind.). These antioxidants, which act as free radical scavengers, may be used alone or in combination with other antioxidants such as phosphite antioxidants, e.g., Irgafos® 168 available from Ciba-Geigy. Other antioxidants include Cyanox® LTDP, a thioether antioxidant available from Cytec Industries (Stamford, Conn.); and Ethanox® 330, a hindered phenolic antioxidant available from Albemarle (Baton Rouge, La.). If present, the antioxidant is in an amount of up to about 2% by weight, based on the total weight of the adhesive composition.

The adhesive composition may include fillers such as talcs, clays, silicas and treated versions thereof, carbon blacks and micas. Examples of commercially available fillers include Mistron Vapor™ talc from Luzenac America, Inc. (Englewood, Colo.).

Other optional ingredients includes ultraviolet (UV) scavengers or absorbers, pigments to add color, fluorescing agents, odor masks, adhesion promoters (i.e. silane), surfactants, defoamers, and so forth. Typically, these ingredients are added in a small amount of typically less than about 5% by weight, or less than about 2% by weight, based on the total weight of the adhesive composition.

The adhesive composition can be prepared by reacting the polyol component with the polyisocyanate component at an elevated temperature of from about 40° C. to about 200° C. The polyol component may first be introduced into a reaction vessel, heated to reaction temperatures and dried to remove ambient moisture absorbed by the polyols. The polyisocyanate component is then added to the reactor. The reaction between the polyol component and the polyisocyanate component is conducted at an OH:NCO ratio of from about 0.75:1.0 to about 0.15:1.0 to obtain an isocyanate content in the final adhesive of from about 1% to about 5% by weight, based on the total weight of the adhesive composition. The resultant adhesive composition is then packaged in a suitable moisture proof container.

The adhesive compositions can be cured after application using a variety of mechanisms. The curing reaction occurs between a compound having an available active hydrogen atom and the NCO groups of the polyurethane prepolymer. A variety of reactive compounds having free active hydrogen(s) are known in the art including water, hydrogen sulfide, polyols, ammonia and other active compounds. These curing reactions may be carried out by relying on ambient moisture, or the active compounds may be added to the composition at the bond line. When the compositions react with water, urea groups are formed to provide a polyurethane urea polymer.

The adhesive composition has a viscosity of less than about 12,000 cPs at 90° C. In some embodiments, the adhesive composition has a viscosity of from about 2,000 cps to about 8,000cps at 90° C. In other embodiments, the adhesive composition has a viscosity of from about 3,000 to about 6,000 cPs at 90° C. The temperature of application may therefore be low from about 70° C. to about 110° C. (158° F. to about 230° F.), or from about 80° C. to about 100° C. (about 175° F. to about 212° F.), or from about 80° C. to about 95° C. (about 175° F. to about 200° F.).

The resultant adhesive compositions generally have superior green strength, referring to the bond strength prior to cure. The resultant compositions may have a rate of set ranging anywhere from about 30 seconds or less to about 30 minutes. This set time simply refers to the formation of a tack free film.

Application methods may include slot die coating, roll coating, gravure coating, transfer coating, pattern coating, screen printing, spray and filament applications, extrusion and so forth. The application temperature may be varied between about 70° C. and about 110° C. The sensitivity of the substrate to high temperatures may determine which application temperature is applicable. Such physical characteristics as the viscosity and rate of set of the compositions may be varied to accommodate such application conditions.

The invention is further illustrated by the following non-limiting examples. All the parts, percentages, ratios, amounts are by weight except otherwise specified.

EXAMPLES

Test Methods

Melt Viscosity

The melt viscosity of a hot melt moisture cure polyurethane adhesive composition is determined on a Brookfield Thermosel Viscometer Model DV-I using a number 27 spindle.

Molecular Weight

The molecular weight of the hot melt moisture cure polyurethane prepolymer is measured by Gel Permeation Chromatography (GPC) molecular weight analysis.

Adhesion

The adhesion of a secondary fabric to a primary fabric is tested according the following method.

A 3"×6" piece of a primary fabric is laid down on a work surface and taped at one wide end of the piece for about 1". An adhesive in melt form is applied using a metal applicator at an application temperature. A secondary fabric, which has been treated with a water repellent material on its two surfaces, is placed on the top of the adhesive layer as soon as the adhesive is applied. A release paper is placed on the top of the bonded laminate to protect it. A roller is used to apply the pressure throughout the bonded laminate. Thereafter, the bonded laminate is kept at ambient temperature and about 50% relative humidity for about 7 days to allow the adhesive to be cured. To test the adhesion, the bonded laminate is peeled by human hands and the adhesion on the secondary fabric is observed and rated from 1 to 5. The higher the rating is, the stronger the adhesion is.

Examples 1-3 and Comparative Examples 1-2

Each of the hot melt moisture cure polyurethane adhesive compositions in Examples 1-3 and Comparative Examples 1-2 is prepared by reacting the ingredients according to Table I.

The resultant adhesive compositions are tested according to the Adhesion test method and the results are listed in Table II.

TABLE I

| Ingredients | Description of Ingredients | Ex. 1 | Ex. 2 | Ex. 3 | Com. Ex. 1 | Com. Ex. 2 |
|---|---|---|---|---|---|---|
| Poly-G 20-112 | First polyether polyol | 31.6 | 22.8 | | | |
| Poly-G 20-265 | second polyether polyol | | | 19 | | |
| Poly-G 55-56 | First polyether polyol | | | 20 | | 12 |
| Acclaim 4220N | First polyether polyol | | | 20 | | |
| Desmophen S-107-55 | First polyester polyol | 20 | 22.8 | | | |
| Desmophen S-105-36 | Crystalline polyester polyol | | 34.2 | | | |
| Desmophen S-105-22 | Crystalline polyester polyol | | | | 15 | 5 |
| Desmophen S-1028-55 | First polylester polyol | | | | | 30.5 |
| Dynacoll 7210 | First polyester polyol | | | | 44 | |
| Dynacoll 7361 | Crystalline polyester polyol | 15 | | 16 | | |
| Dynacoll 7340 | Crystalline polyester polyol | | | | 10 | |
| Dynacoll X7371 | Crystalline polyester polyol | | | | | 10 |
| Stepanpol PN-110 | Amorphous polyester polyol | 10 | | | | 20 |
| Stepanpol PHN-56 | Amorphous polyester polyol | | | | 12 | |
| Pearlbond 503 | Thermoplastic polyurethane | | | | 4 | |
| BNX 1010 | Antioxidant | 0.46 | | 0.46 | | |
| Unitex OB | UV stabilizer | 0.01 | | 0.01 | 0.01 | 0.01 |
| Jeffcat DMDEE | Catalyst | 0.03 | 0.03 | 0.03 | | |
| Irganox 1010 | Antioxidant | | | | 0.29 | |
| Isonate 125M | Isocyanate | 22.9 | 20.17 | 24.5 | 13.7 | 21.5 |
| Mistron Vapor | Talc | | | | 1 | 0.99 |
| Weight average Molecular Weight of the prepolymer | | 10,600 | 12,700 | 11,800 | | 25,000 |

TABLE II

| | Adhesion | | |
|---|---|---|---|
| | DWR* laminate #1 | DWR laminate #2 | DWR laminate #3 |
| Ex. 1 | 4 | 4 | 4 |
| Ex. 2 | 4 | 4 | 4 |
| Ex. 3 | 4 | 4 | 4 |
| Com. Ex. 1 | 0 | 0 | 0 |
| Com. Ex. 2 | 0 | 0 | 1 |

*DWR: durable water repellent

I claim:

1. A method of making a water repellent laminate comprising a primary substrate having a first surface and a second surface and a secondary substrate having a bonding surface and an exposing surface, said bonding surface and exposing surface of said secondary substrate have been treated with a water repellent material, said method comprising:

a) applying a hot melt moisture cure polyurethane adhesive composition on said first surface of said primary substrate to form an adhesive bearing surface; and b) bonding said adhesive bearing surface of said primary substrate with said bonding surface of said secondary substrate to form a laminate, wherein said adhesive composition comprises a hot melt moisture cure polyurethane prepolymer having a weight average molecular weight of no greater than about 20,000 g/mole, said prepolymer being a reaction product of a polyol component and a polyisocyanate component, said polyol component comprising a first polyether polyol formed from at least one monomer chosen from ethylene oxide, propylene oxide, 1,2-butylene oxide, 1,4-butylene oxide, or mixtures thereof; a first polyester polyol having a melting point of less than about 40° C.; and a crystalline polyester polyol having a melting point of from about 40° C. to about 120° C.

2. The method of claim 1, wherein said polyol component further comprises an amorphous polyester polyol having a number average molecular weight of from about 500 g/mole to about 6,000 g/mole.

3. The method of claim 1, wherein said first polyether polyol is a homopolymer of propylene oxide, or a copolymer of propylene oxide and ethylene oxide; said polyol having a number average molecular weight of from about 500 g/mole to about 4,000 g/mole.

4. The method of claim 1, wherein said polyisocyanate component is diphenylmethane-4,4'-diisocyanate.

5. The method of claim 1, wherein said adhesive composition has a viscosity of from about 2,000 cps to about 8,000 cps at 90° C.

6. The method of claim 1, wherein said primary substrate is a thermoplastic film chosen from polytetrafluoroethylene (PTFE), thermoplastic polyurethane resin (TPU), polyester, or polypropylene.

7. The method of claim 1, wherein said secondary substrate comprises woven or nonwoven fabric, cotton, polyester, or polyamide.

8. The method of claim 1, wherein said laminate exhibits washing resistance.

9. A laminate made by the method of claim 1.

10. A garment comprising the laminate of claim 9.

11. The method of claim 1, wherein said adhesive composition has a viscosity of less than about 12,000 cps at 90° C.

* * * * *